Oct. 5, 1971                 K. R. KELLY                 3,609,976
TEMPERATURE CONTROL BY MASS FLOW CONTROL OF
GASES IN A GAS TURBINE ENGINE
Filed Oct. 15, 1969
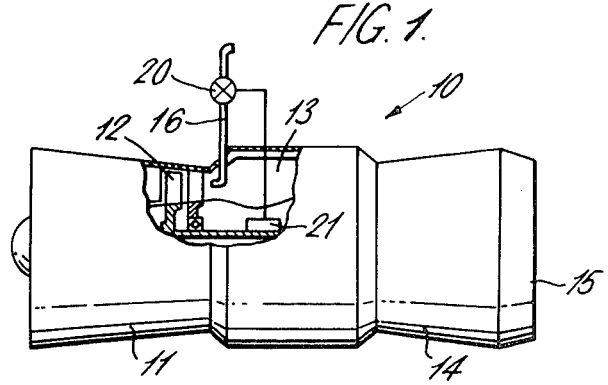
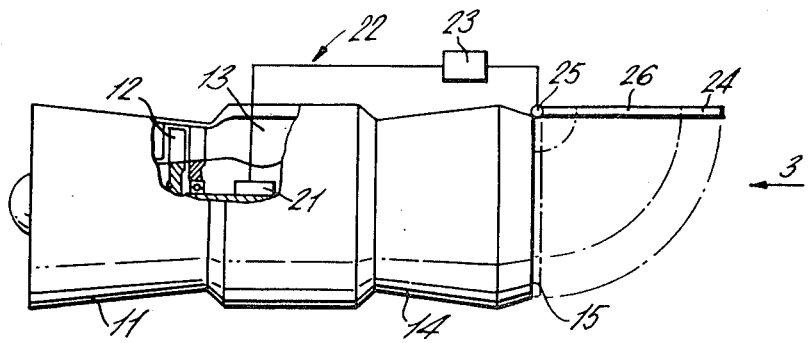
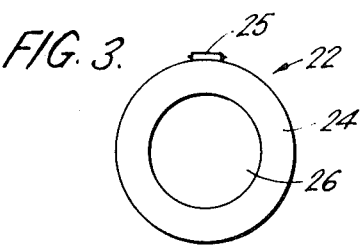
Inventor
Kenneth Reginald Kelly
By Cushman, Darby & Cushman
Attorneys

United States Patent Office 3,609,976
Patented Oct. 5, 1971

3,609,976
TEMPERATURE CONTROL BY MASS FLOW CONTROL OF GASES IN A GAS TURBINE ENGINE
Kenneth Reginald Kelly, Hinckley, England, assignor to Rolls-Royce Limited, Derby, Derbyshire, England
Filed Oct. 15, 1969, Ser. No. 866,492
Claims priority, application Great Britain, Oct. 16, 1968, 49,129/68
Int. Cl. F02k 3/02
U.S. Cl. 60—226     6 Claims

ABSTRACT OF THE DISCLOSURE

A gas turbine engine comprising sensor means responsive to a function of engine rotational speed, and control means, which are brought into operation by the sensor means only when the said speed does not exceed idling speed, the control means, when operated, increasing the gas temperature in a region downstream of the upstream end of the combustion equipment of the engine to substantially eliminate the presence of unburnt fuel in the exhaust gases leaving the engine.

---

This invention concerns a gas turbine engine, and, although the invention is not so restricted, it is more particularly concerned with a gas turbine engine which is intended to be supplied with diesel fuel, the engine being, for example, adapted for use in an air cushion vehicle such as the "Hovercraft" (registered trademark).

Such a gas turbine engine using diesel fuel is liable, at speeds at or below idling speeds, to produce visible and odorous smoke due to the presence of unburnt fuel in the exhaust gases.

According, therefore, to the present invention, there is provided a gas turbine engine comprising sensor means for sensing the engine rotational speed, or for sensing an engine variable which varies in sympathy with said speed, and control means, which are brought into operation by the sensor means only when the said speed is at or below idling speed, and which bring about an increase in the gas temperature in or downstream of the combustion equipment of the engine to an extent sufficient substantially to eliminate the presence of unburnt fuel in the exhaust gases leaving the engine.

The control means, when brought into operation by the sensor means, preferably reduce the mass flow through the combustion equipment.

Thus the control means may comprise a duct for bleeding air from compressor means of the engine, the duct being provided with a valve which is opened and closed by the said sensor means. The duct preferably bleeds air from the downstream end of the said compressor means.

Alternatively, the engine may be a gas turbine jet propulsion or propeller turbine engine having a propulsion nozzle, the control means comprising means for reducing the nozzle outlet area of the said propulsion nozzle when the rotational speed of the engine is at or below idling speed. Thus, the means for reducing the nozzle outlet area may comprise a blanking plate having an orifice therein, the blanking plate being pivotally connected to the engine casing and being movable under the control of the sensor means between operative and inoperative positions.

The sensor means may, for example, be responsive to compressor delivery pressure.

The invention is illustrated, merely by way of example, in the accompanying diagrammatic drawings, in which:

FIG. 1 is a view partly, in section of one embodiment of a gas turbine engine according to the present invention,
FIG. 2 is a view, partly in section, of another embodiment of a gas turbine engine according to the present invention, and
FIG. 3 is a view looking in the direction of the arrow 3 of FIG. 2.

In FIG. 1 there is shown a gas turbine engine 10 having an engine casing 11 in which there are disposed, in flow series, a compressor 12 (or compressors) combustion equipment 13 and a turbine (or turbines) 14, the turbine exhaust gases being directed to atmosphere through a jet pipe terminating in a nozzle 15.

A bleed duct 16 (which may, for example, have a diameter of 2½″) is arranged immediately upstream of the combustion equipment 13 so as to bleed air directly from the downstream end of the compressor 12. The bleed duct 16 contains a valve 20 which may be of the rotary type as shown, or may be a butterfly valve (not shown). The valve 20 is arranged to be opened and closed under the control of a sensor device 21. The sensor device 21 may either sense the engine rotational speed of the engine 10, or may sense the compressor delivery pressure or some other engine variable which varies in sympathy with engine rotational speed.

The arrangement is such that whenever the engine rotational speed is at or below idling speed, e.g. is in the range 4,500 to 6,000 revolutions per minute, the sensor device 21 causes the valve 20 to be open and thus to bleed compressor delivery air from the downstream end of the compressor 12, the sensor device 21 at all other times, causing the valve 20 to be closed, so as to shut off said bleed.

Accordingly at all speeds at or below idling speed, the mass flow through the combustion equipment 13 will be reduced and the gas temperature in the combustion equipment 13 and downstream thereof will rise. The arrangement is such as to cause a sufficient rise in temperature as substantially to eliminate the presence of unburnt fuel in the exhaust gases leaving the engine 10. For example, the jet pipe temperature may be raised, at and below idling, from 450° C. to a temperature in the range 570°–600° C. The arrangement may, moreover, be such as to raise the combustion efficiency to at least 92%.

In FIGS. 2 and 3, there is shown a gas turbine engine 22 which is of generally similar construction to that of FIG. 1 and which for that reason will not be described in detail, like parts being given the same reference numerals.

In the gas turbine engine of FIGS. 2 and 3, however, a bleed duct 16 with a valve 20 therein is not employed and, instead, the sensor device 21 controls a ram 23 which is arranged to move a blanking plate 24. The blanking plate 24 is pivotally connected at a hinge 25 to the engine casing 11 and is movable by the ram 23 between an inoperative position, which is shown in full lines in FIG. 2, and an operative position, which is shown in dotted lines therein.

In the inoperative position, the blanking plate 24, which has an orifice 26 therein, is so positioned as not to affect the nozzle outlet area of the engine. When, however, the blanking plate 24 is in the operative position, the nozzle outlet area is reduced. The arrangement is such that when the rotational speed of the engine is at or below the idling speed, the blanking plate 24 reduces the nozzle outlet area of the engine to such an extent that the mass flow through the combustion equipment 13 is reduced and the gas temperature therein and downstream thereof is increased to an extent sufficient substantially to eliminate the presence of unburnt fuel in the exhaust gases leaving the engine.

The blanking plate may, for example, have a diameter of 30 inches with an orifice of 12″ diameter.

I claim:
1. A gas turbine engine comprising: compressor means, combustion equipment and turbine means in flow series; sensor means operatively responsive to a function of engine rotational speed; means to operatively reduce mass flow through said combustion equipment and to increase the gas temperature in a region downstream of the upstream end of said combustion equipment for substantially eliminating presence of unburnt fuel in exhaust gases leaving the engine; and control means operatively connected to said mass flow reducing means for operating the same, said control means being operatively connected to said sensor means and actuated thereby when said sensor means senses the rotational speed of the engine is no greater than the idle speed of the engine.

2. A gas turbine engine as claimed in claim 1 in which said mass flow reducing means comprises a duct operatively connected to said compressor means for bleed of air therefrom, said control means comprising a valve in said duct and opened and closed by said sensor means.

3. A gas turbine engine as claimed in claim 2 in which said duct is operatively connected to the downstream end of said compressor means.

4. A gas turbine engine as claimed in claim 1 including a propulsion nozzle downstream of said turbine means, and in which said mass flow reducing means includes means to reduce the propulsion nozzle outlet area when said control means is actuated by said sensor means sensing the rotational speed of the engine as no greater than the idle speed of the engine.

5. A gas turbine engine as claimed in claim 4 in which said means for reducing nozzle outlet area comprises a blanking plate having an orifice therein, said blanking plate being pivotally connected to said engine and being movable between an inoperative position and an operative position where the nozzle outlet area is reduced.

6. A gas turbine engine as claimed in claim 1 in which said sensor means is responsive to delivery pressure of said compressor means.

References Cited

UNITED STATES PATENTS

| | | | |
|---|---|---|---|
| 2,481,330 | 9/1949 | Neal | 60—242 X |
| 2,565,854 | 8/1951 | Johnstone | 60—242 |
| 2,612,747 | 10/1952 | Skinner | 60—242 |
| 2,694,289 | 11/1954 | Alford | 60—242 |
| 3,108,767 | 10/1963 | Eltis | 60—242 X |

FOREIGN PATENTS

| | | | |
|---|---|---|---|
| 896,013 | 10/1958 | Great Britain | 60—242 |

CLARENCE R. GORDON, Primary Examiner

U.S. Cl. X.R.

60—39.16, 242